US012562108B2

(12) United States Patent
Ishii

(10) Patent No.: US 12,562,108 B2
(45) Date of Patent: Feb. 24, 2026

(54) DISPLAY DEVICE

(71) Applicant: Japan Display Inc., Tokyo (JP)

(72) Inventor: Tatsuya Ishii, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 19/061,084

(22) Filed: Feb. 24, 2025

(65) Prior Publication Data

US 2025/0329293 A1 Oct. 23, 2025

(30) Foreign Application Priority Data

Apr. 18, 2024 (JP) ................................ 2024-067662

(51) Int. Cl.
*G09G 3/32* (2016.01)

(52) U.S. Cl.
CPC ....... *G09G 3/32* (2013.01); *G09G 2300/0426* (2013.01); *G09G 2310/0267* (2013.01)

(58) Field of Classification Search
CPC .................. G09G 3/32; G09G 3/3266; G09G 2300/0426; G09G 2310/0267; G09G 2310/0286; G09G 3/3233; G09G 3/3258; G09G 2300/0804; G09G 2310/0232; G09G 2310/0297; H10K 59/00; H10K 59/123; H10K 59/131; H10K 59/84
See application file for complete search history.

(56) References Cited

U.S. PATENT DOCUMENTS

2017/0269413 A1 9/2017 Tamaki et al.
2019/0302815 A1* 10/2019 Tanaka .................... G05F 1/467
2020/0004071 A1* 1/2020 Tamaki ............... G02F 1/13452
2021/0005698 A1* 1/2021 Lee .................... H10K 59/8792
2023/0017957 A1* 1/2023 Koide ....................... G09F 9/30
2023/0043145 A1* 2/2023 Yuan .................... G09G 3/3258
2023/0222969 A1* 7/2023 Peng ........................ G09G 3/32
345/55
2024/0004248 A1* 1/2024 Kawashima ......... G09G 3/3291
2024/0096288 A1* 3/2024 Zheng ................. G09G 3/3233

FOREIGN PATENT DOCUMENTS

JP 2020-012977 A 1/2020

* cited by examiner

*Primary Examiner* — Amr A Awad
*Assistant Examiner* — Aaron Midkiff
(74) *Attorney, Agent, or Firm* — K&L Gates LLP

(57) ABSTRACT

A display device includes a plurality of pixels and at least one scanning-line driver circuit. The plurality of pixels each includes a light-emitting element and a pixel circuit electrically connected to the light-emitting element. The scanning-line driver circuit is electrically connected to the plurality of pixels. The pixel circuits each do not overlap the scanning-line driver circuit. A display region partly overlaps the scanning-line driver circuit. The pixel circuits are arranged in a matrix form having a plurality of rows and a plurality of columns. The pixel circuits each include a driving transistor configured to supply a current to the light-emitting element and a switching transistor configured to supply the current from the driving transistor to the light-emitting element. The switching transistor and the light-emitting element are electrically connected to each other through a relay wiring in each pixel.

16 Claims, 16 Drawing Sheets

DISPLAY DEVICE

CROSS-REFERENCE TO RELATED APPLICATIONS

This application claims the benefit of priority to Japanese Patent Application No. 2024-067662, filed on Apr. 18, 2024, the entire contents of which are incorporated herein by reference.

FIELD

An embodiment of the present invention relates to a display device having a light-emitting element.

BACKGROUND

In the field of flat panel displays, the development of technologies for further increasing the size and narrowing the frame size of display devices remains one of the most important issues. For example, Japanese laid-open patent applications No. 2017-167403 and 2020-12977 disclose that it is possible to provide a display device with a narrower frame by arranging display elements even in the frame region in which display elements are not usually arranged but driver circuits are provided.

SUMMARY

An embodiment of the present invention is a display device. The display device includes a plurality of pixels and at least one scanning-line driver circuit. The pixels each include a light-emitting element and a pixel circuit electrically connected to the light-emitting element. The at least one scanning-line driver circuit is electrically connected to the plurality of pixels. The pixel circuits each do not overlap the at least one scanning-line driver circuit. A display region defined as a minimum rectangle encompassing all of the light-emitting elements partly overlaps the at least one scanning-line driver circuit. The pixel circuits are arranged in a matrix form having a plurality of rows and a plurality of columns. The pixel circuits each include a driving transistor configured to supply a current to the light-emitting element and a switching transistor configured to supply the current from the driving transistor to the light-emitting element. The switching transistor and the light-emitting element are electrically connected to each other through a relay wiring in each of the pixels.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure. In addition, a mode expressed by this expression includes a mode where a structure is not in contact with other structures.

In the present invention, when one film is processed to form a plurality of films, these films may have different functions and roles. However, these films originate from the film prepared as the same layer by the same process and have substantially the same layer structure, material, and morphology. Hence, the plurality of films is defined as existing in the same layer.

First Embodiment

In the present embodiment, a structure of a display device 100 according to an embodiment of the present invention is explained.

1. Overall Structure

Figure 1:
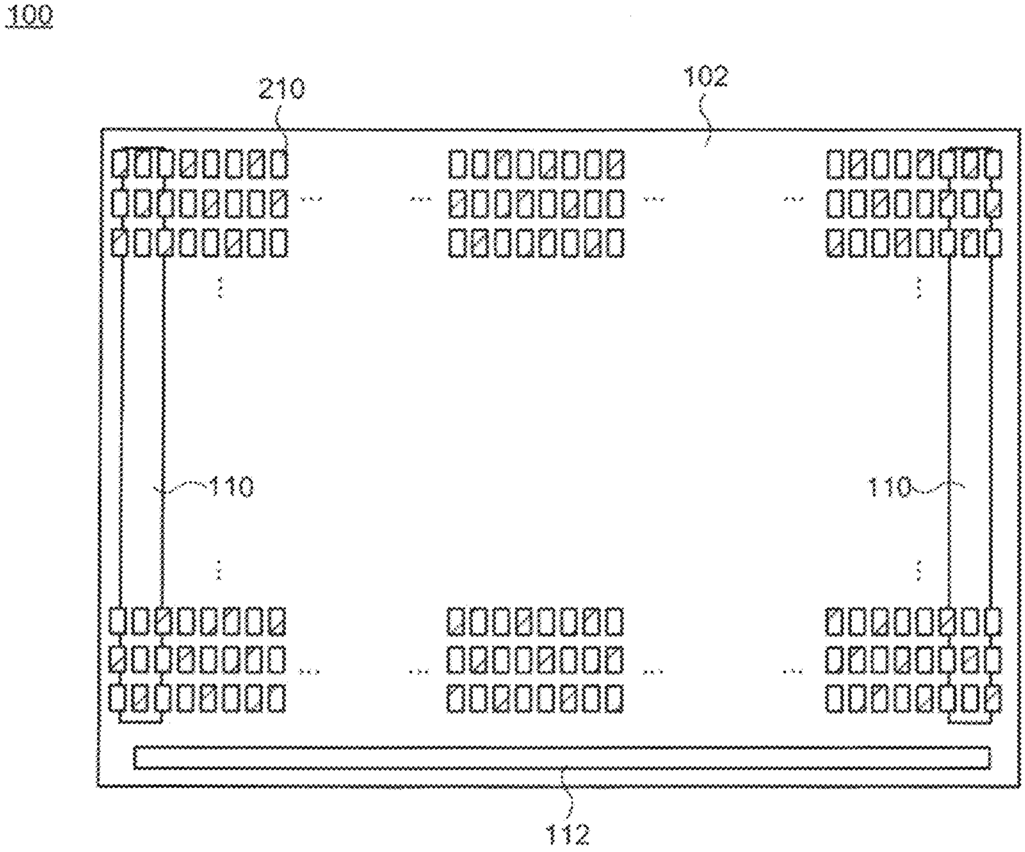
FIG. 1 is a schematic top view of a display device according to an embodiment of the present invention.

A schematic top view of the display device 100 according to an embodiment of the present invention is shown in FIG. 1. As shown in FIG. 1, the display device 100 has a substrate 102 and a counter substrate which is not illustrated in FIG. 1, and a variety of patterned conductive films, insulating films, and semiconductor films is stacked between the substrate 102 and the counter substrate. These conductive films, insulating films, and semiconductor films are combined as appropriate to form a plurality of electroluminescence elements (hereinafter simply referred to as light-emitting elements) 210 and driver circuits for driving the light-emitting elements 210 (scanning-line driver circuit 110, signal-line driver circuit 112) as well as a plurality of terminals for receiving signals and power supplies from an external circuit (not illustrated) and the like. The smallest rectangle simultaneously encompassing all of the light-emitting elements 210 is called a display region, and a region surrounding the display region is called a frame region. Each light-emitting element 210 is one of the components of the pixel which is the smallest unit providing color information and is controlled by a pixel circuit included in the pixel as described below. Hereinafter, these components are described.

2. Substrate and Counter Substrate

The substrate 102 and the counter substrate 104 (see FIG. 10, etc., below) are provided to provide physical strength to the display device 100 and to arrange and protect the light-emitting elements 210, the scanning-line driver circuit 110, and the signal-line driver circuit 112. The substrate 102 and the counter substrate 104 may each be an inorganic material-containing substrate such as a crystalline semiconductor substrate, a glass substrate, and a quartz substrate or may contain a polymer such as a polyimide, a polyamide, and a polycarbonate. The substrate 102 and the counter substrate 104 may or may not be flexible. In the former case, the substrate 102 and/or the counter substrate 104 may be sufficiently flexible to be elastically deformable or highly flexible sufficient to be plastically deformed. The emission from the light-emitting elements 210 is extracted through the counter substrate 104. Accordingly, at least the counter substrate 104 is configured to transmit visible light. The substrate 102 may be configured to transmit visible light or may be configured not to transmit visible light.

There are no restrictions on the size of the substrate 102 and the counter substrate 104. For example, a large rectangular amorphous glass substrate, also called mother glass, may be used as the substrate 102 and the counter substrate 104. Specifically, a glass substrate with a size of 2160 mm×2460 mm, also called the 8th generation mother glass, a glass substrate with a size of 2400 mm×2800 mm, also called the 9th generation mother glass, a glass substrate with a size of 2880 mm×3130 mm, also called the 10th generation mother glass, or even larger glass substrates may be used. As described below in detail, the embodiment of the present invention is capable of effectively suppressing the increase in load on the driver circuits caused by the increase in size of the display device, which enables the production of high-resolution and large-sized display devices. Therefore, it is also possible to produce ultra-large-sized display devices such as those exceeding 100 inches, for example, by using the aforementioned large glass substrates.

3. Driver Circuit

The scanning-line driver circuit 110 and the signal-line driver circuit 112 are configured to receive signals supplied from external circuits, generate control signals to control the pixel circuits, and provide power supplies along with these control signals to the pixel circuits. The display device 100 has at least one scanning-line driver circuit 110 along with the signal-line driver circuit 112. These driver circuits are arranged along the edge portions of the substrate 102.

Figure 2:
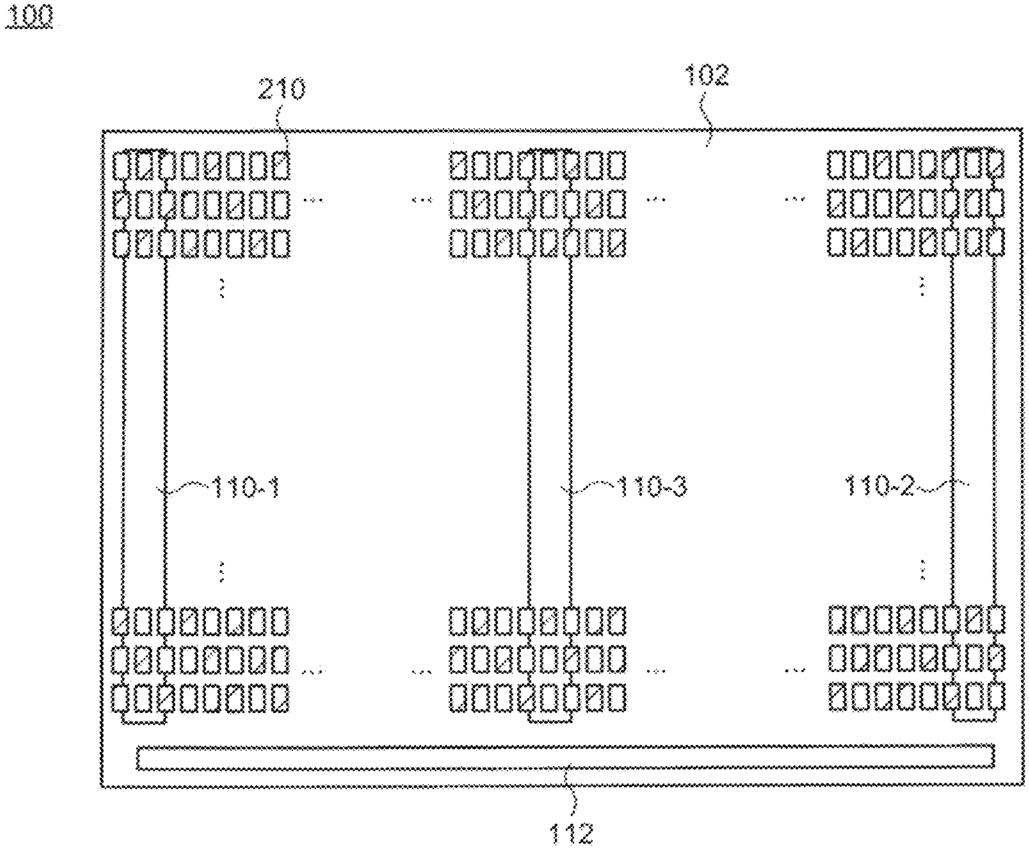
FIG. 2 is a schematic top view of a display device according to an embodiment of the present invention.

The scanning-line driver circuit 110 is composed of a shift register circuit, a scan driver circuit, a sub-signal line selection circuit, and the like and are fabricated by combining a plurality of transistors and capacitance elements over the substrate 102 as appropriate. There is no restriction on the number of scanning-line driver circuits 110. For example, a single scanning-line driver circuit 110 may be provided over the substrate 102, or a pair of scanning-line driver circuits 110 may be provided over the substrate 102 as shown in FIG. 1. Alternatively, three scanning-line driver circuits (here, a first scanning-line driver circuit 110-1, a second scanning-line driver circuit 110-2, and a third scanning-line driver circuit 110-3) may be provided over the substrate 102 as shown in FIG. 2. In this case, the first scanning-line driver circuit 110-1 and the second scanning-line driver circuit 110-2 are provided along the mutually facing edge portions of the substrate 102, while the third scanning-line driver circuit 110-3 is provided so as to be sandwiched by the first scanning-line driver circuit 110-1 and the second scanning-line driver circuit 110-2. When three scanning-line driver circuits 110 are provided, the pixels located between the first scanning-line driver circuit 110-1 and the second scanning-line driver circuit 110-2 can be driven by the first scanning-line driver circuit 110-1 and the second scanning-line driver circuit 110-2, while the pixels located between the second scanning-line driver circuit 110-2 and the third scanning-line driver circuit 110-3 can be driven by the second scanning-line driver circuit 110-2 and the third scanning-line driver circuit 110-3. That is, all of the pixels can be divided into a plurality of blocks, and each scanning-line driver circuit 110 may control only the pixels in the corresponding block. This feature reduces the load on each scanning-line driver circuit 110. Although not illustrated, four or more scanning-line driver circuits 110 may be arranged.

Similar to the scanning-line driver circuit 110, the signal-line driver circuit 112 is arranged along an edge portion of the substrate 102 so that its longitudinal direction intersects the longitudinal direction of the scanning-line driver circuit 110. Similar to the scanning-line driver circuit 110, the signal-line driver circuit 112 may be formed by combining transistors and capacitance elements provided over the substrate 102, or an integrated circuit may be separately formed using a single-crystal semiconductor substrate and mounted over the substrate 102 as the signal-line driver circuit 112. None of the plurality of light-emitting elements 210 may overlap the signal-line driver circuit 112, or a part of them may overlap the signal-line driver circuit 112. Alternatively, the signal-line driver circuit 112 may not be disposed over the substrate 102, and the signal-line driver circuit 112 may be arranged over a connector (not illustrated) such as a flexible printed circuit board connecting the display device 100 to an external circuit.

4. Pixel

As mentioned above, each pixel includes the pixel circuit and the light-emitting element 210 electrically connected thereto.

4-1. Light-Emitting Element (1) Arrangement

As shown in FIG. 1 and FIG. 2, the light-emitting elements 210 of the plurality of pixels are arranged in a matrix form having a plurality of rows and a plurality of columns. Here, a column direction is the longitudinal direction of the scanning-line driver circuit 110 (i.e., the extending direction of the scanning-line driver circuit 110), while a row direction is a direction perpendicular to the longitudinal direction of the scanning-line driver circuit 110. As can be understood from FIG. 1 and FIG. 2, a part of the plurality of light-emitting elements 210 overlaps the scanning-line driver circuit 110, while none of the other parts overlap the scanning-line driver circuit 110. That is, a part of the display region overlaps the scanning-line driving circuit 110, and the other part does not overlap the scanning-line driving circuit 110. Therefore, the display region, i.e., the plurality of light-emitting elements 210, can be arranged in the entire area between the two mutually facing sides of the substrate 102 without considering the shape and area of the scanning-line driver circuit 110. This arrangement allows the display device 100 to have a narrow frame, reducing the frame region and securing a large display region.

Figure 3:
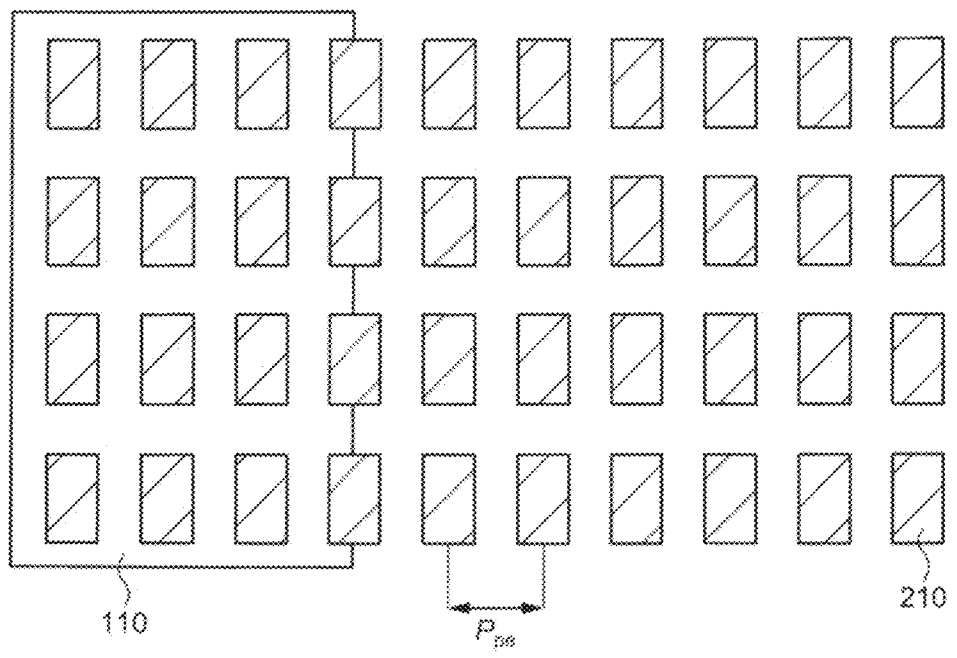
FIG. 3 is a schematic top view of a display device according to an embodiment of the present invention.

The plurality of light-emitting elements 210 is provided at the same pitch over the entire display region. Namely, the spacing between adjacent light-emitting elements 210 is the same in each row as shown in FIG. 3, and thus the pitch $P_{pe}$ of the light-emitting elements 210 is also constant. In the column direction, the spacing between adjacent light-emitting elements 210 and the pitch of the light-emitting elements 210 are also constant. This arrangement allows the color information generated by the pixels to be provided uniformly over the entire display region.

(2) Structure

Figure 4:
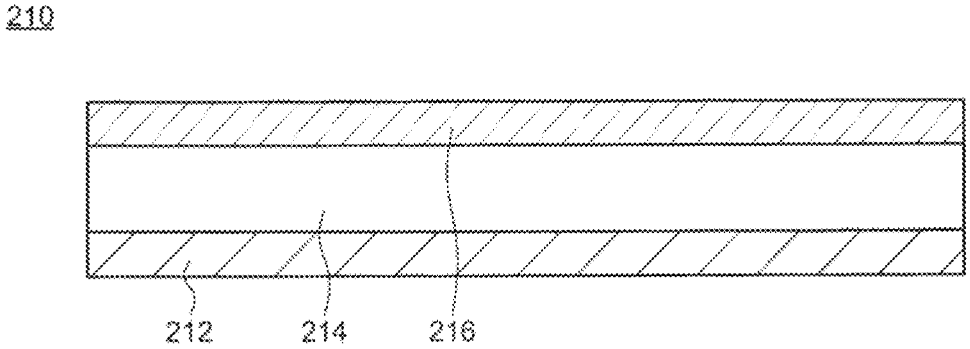
FIG. 4 is a schematic cross-sectional view of a light-emitting element included in a display device according to an embodiment of the present invention.

A schematic cross-sectional view of the light-emitting element 210 is shown in FIG. 4. The light-emitting element 210 has a pixel electrode 212 and a counter electrode 216 overlapping each other in the vertical direction (normal direction of the substrate 102) as well as an electroluminescence layer (hereafter, EL layer) 214 containing an organic compound between the pixel electrode 212 and the counter electrode 216. When a potential difference is provided between the pixel electrode 212 and the counter electrode 216, carriers injected from the pixel electrode 212 and the counter electrode 216 recombine in the EL layer 214, and the energy released when the excited state of the organic compound generated in that process returns to its ground state can be obtained as light.

As described above, since the light from the light-emitting element 210 is extracted through the counter substrate 104, the pixel electrode 212 is also configured to function as a reflective electrode to reflect the light. For example, the pixel electrode 212 is formed as a stacked layer including a film containing a metal with high reflectivity such as silver and aluminum or an alloy thereof and a film of a conductive oxide transmitting visible light such as indium-tin oxide (ITO) and indium-zinc oxide (IZO) provided thereover. On the other hand, the counter electrode 216 is configured to include a conductive oxide transmitting visible light. Alternatively, a metal-containing film having a thickness (e.g., equal to or greater than 5 nm and equal to or less than 20 nm) allowing visible light to pass therethrough may be used as the counter electrode 216. In the latter case, a film of a conductive oxide transmitting visible light may be further provided over the metal-containing film.

There are no restrictions on the structure of the EL layer, and the EL layer may be structured by combining functional layers such as a charge-injection layer, a charge-transporting layer, an emission layer, an exciton-blocking layer, a charge-blocking layer, and the like as appropriate.

4-2. Pixel Circuit (1) Arrangement

Unlike the light-emitting element 210, the pixel circuit constituting the pixel is provided over the substrate 102 so as not to overlap the scanning-line driver circuit 110 and the signal-line driver circuit 112. For example, when the display device 100 has a pair of scanning-line driver circuits 110 as shown in FIG. 1, all of the pixel circuits are sandwiched between the pair of scanning-line driver circuits 110. When the display device 100 has the first scanning-line driver circuit 110-1, the second scanning-line driver circuit 110-2, and the third scanning-line driver circuit 110-3 as shown in FIG. 2, a part of the pixel circuits is sandwiched between the first scanning-line driver circuit 110-1 and the second scanning-line driver circuit 110-2, while the remaining pixel circuits are each sandwiched between the second scanning-line driver circuit 110-2 and the third scanning-line driver circuit 110-3.

Figure 5:
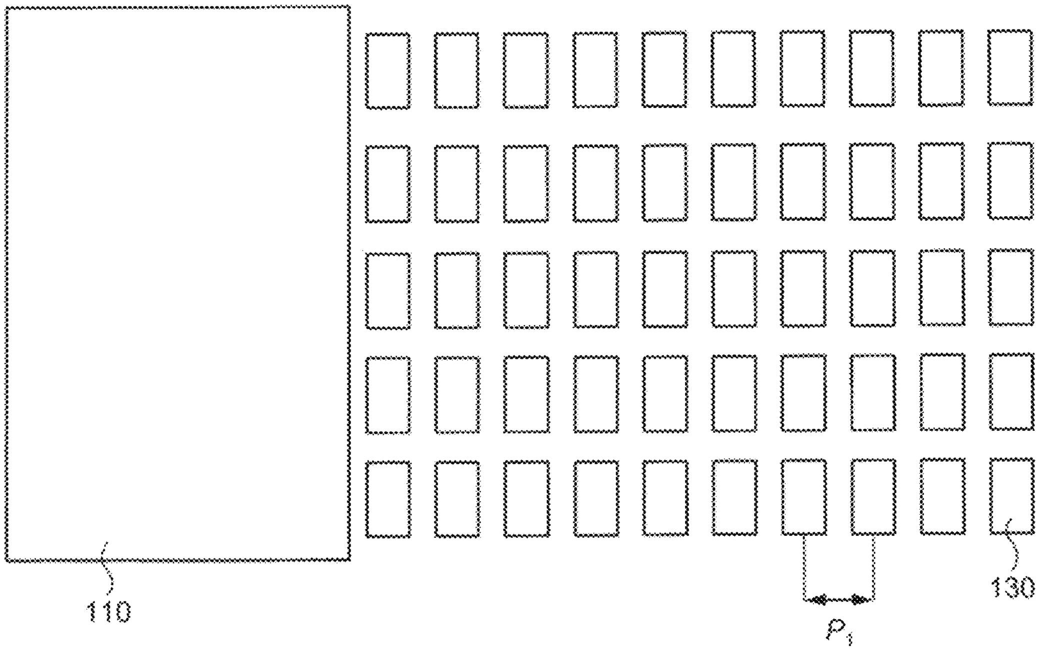
FIG. 5 is a schematic top view of a display device according to an embodiment of the present invention.

Similar to the light-emitting elements 210, the pixel circuits are also arranged in a matrix form having a plurality of rows and a plurality of columns. The number of rows and columns of the matrix of the pixel circuits is the same as that of the light-emitting elements 210 each other. However, the area of the region where the pixel circuits are arranged is smaller than the area of the display region where the light-emitting elements 210 are arranged. Therefore, each pixel circuit is configured so that its footprint is smaller than the footprint of each light-emitting element 210 (more specifically, the area of the pixel electrode 212 or the area of the surface where the pixel electrode 212 and the EL layer 214 are in contact with each other). Furthermore, although all of the pixel circuits are arranged at the same pitch in the column direction, the pixel circuits are arranged at a smaller pitch than the light-emitting elements 210 in the row direction. For example, when all of the pixel circuits 130 are arranged at the same pitch $P_1$ in each row as shown in FIG. 5, the pitch $P_1$ of the pixel circuits 130 is smaller than the pitch $P_{pe}$ of the light-emitting elements 210 (see FIG. 3).

Figure 6:
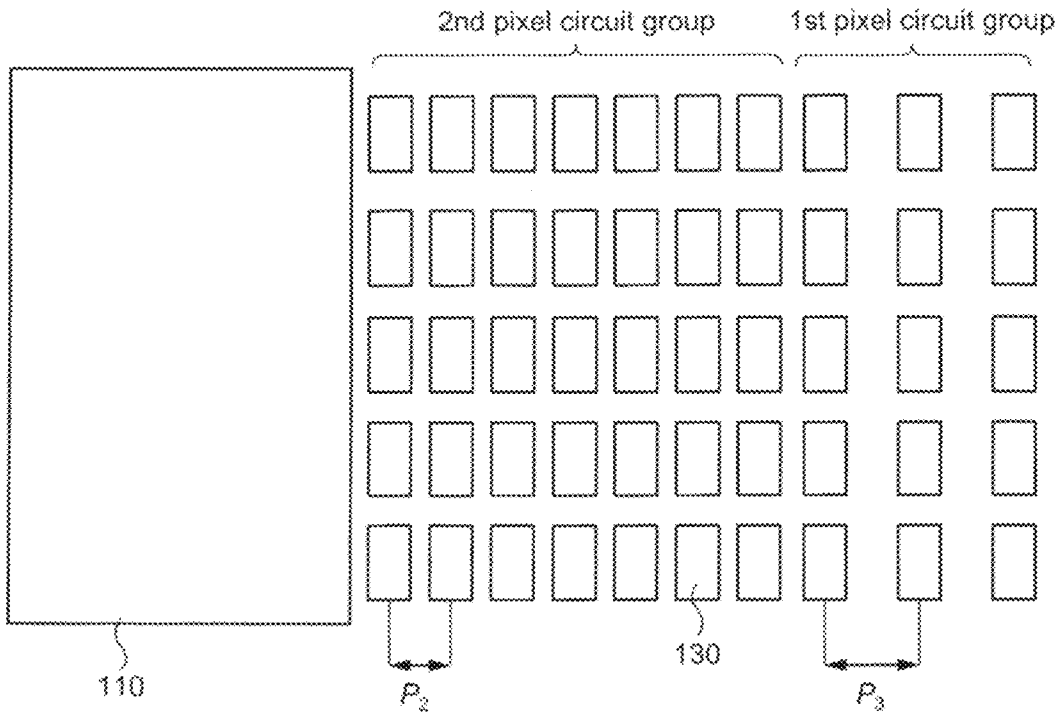
FIG. 6 is a schematic top view of a display device according to an embodiment of the present invention.
Figure 7:
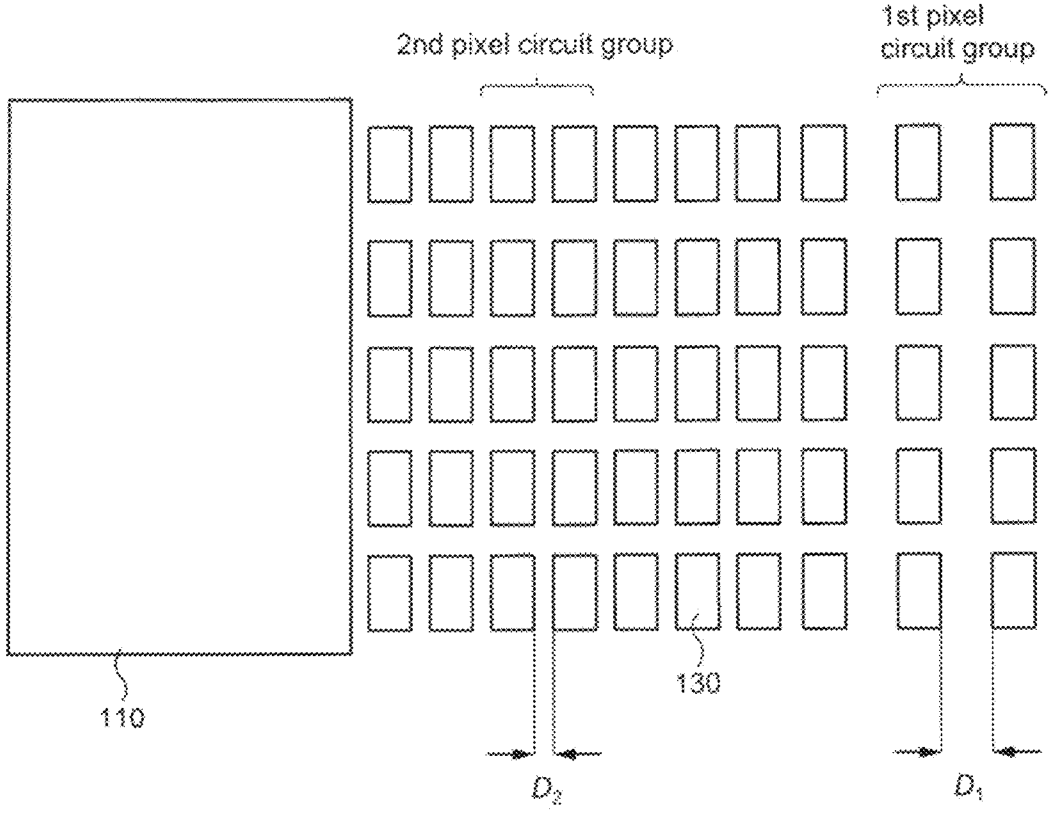
FIG. 7 is a schematic top view of a display device according to an embodiment of the present invention.

Alternatively, the arrangement density of pixel circuits 130 may be varied in each row. For example, the pixel circuits 130 may be arranged so that the pitch $P_2$ of the pixel circuits 130 closer to the scanning-line driver circuit 110 is smaller than the pitch $P_3$ of the pixel circuits 130 farther from the scanning-line driver circuit 110 as shown in FIG. 6. In this case, in each row, all of the pixel circuits 130 are divided into a first pixel circuit group and a second pixel circuit group each containing a plurality of pixel circuits 130. The second pixel circuit group is located closer to the scanning-line driver circuit 110 than the first pixel circuit group. The pixel circuits 130 are arranged at a pitch $P_2$ in the second pixel circuit group, while the pixel circuits 130 are arranged at a pitch $P_3$ larger than the pitch $P_2$ in the first pixel circuit group. The pitch $P_3$ may be the same as or smaller than the pitch $P_2$. In other words, the pixel circuits 130 may be arranged so that, when the first pixel circuit group consisting of two pixel circuits 130 adjacent at a spacing $D_1$ in the row direction and the second pixel circuit group consisting of two pixel circuits 130 adjacent at a spacing $D_2$ in the row direction are set in each row as shown in FIG. 7, the spacing $D_2$ of the second pixel circuit group closer to the scanning-line driver circuit 110 is smaller than the spacing $D_1$ of the first pixel circuit group.

Alternatively, although not illustrated, the pixel circuits 130 may be arranged so that the pitch of the pixel circuits 130 or the distance between adjacent pixel circuits 130 decreases continuously or stepwise with decreasing distance from the scanning-line driver circuit 110 in each row. Note that, when a plurality of scanning-line driver circuits 110 is provided, the pixel circuits 130 are arranged so that the pitch of the pixel circuits 130 is maximum in the middle of adjacent scanning-line driver circuits 110 and the pitch decreases as the distance from the middle of the scanning-line driver circuits 110 increases in the row direction.

(2) Structure

Figure 8:
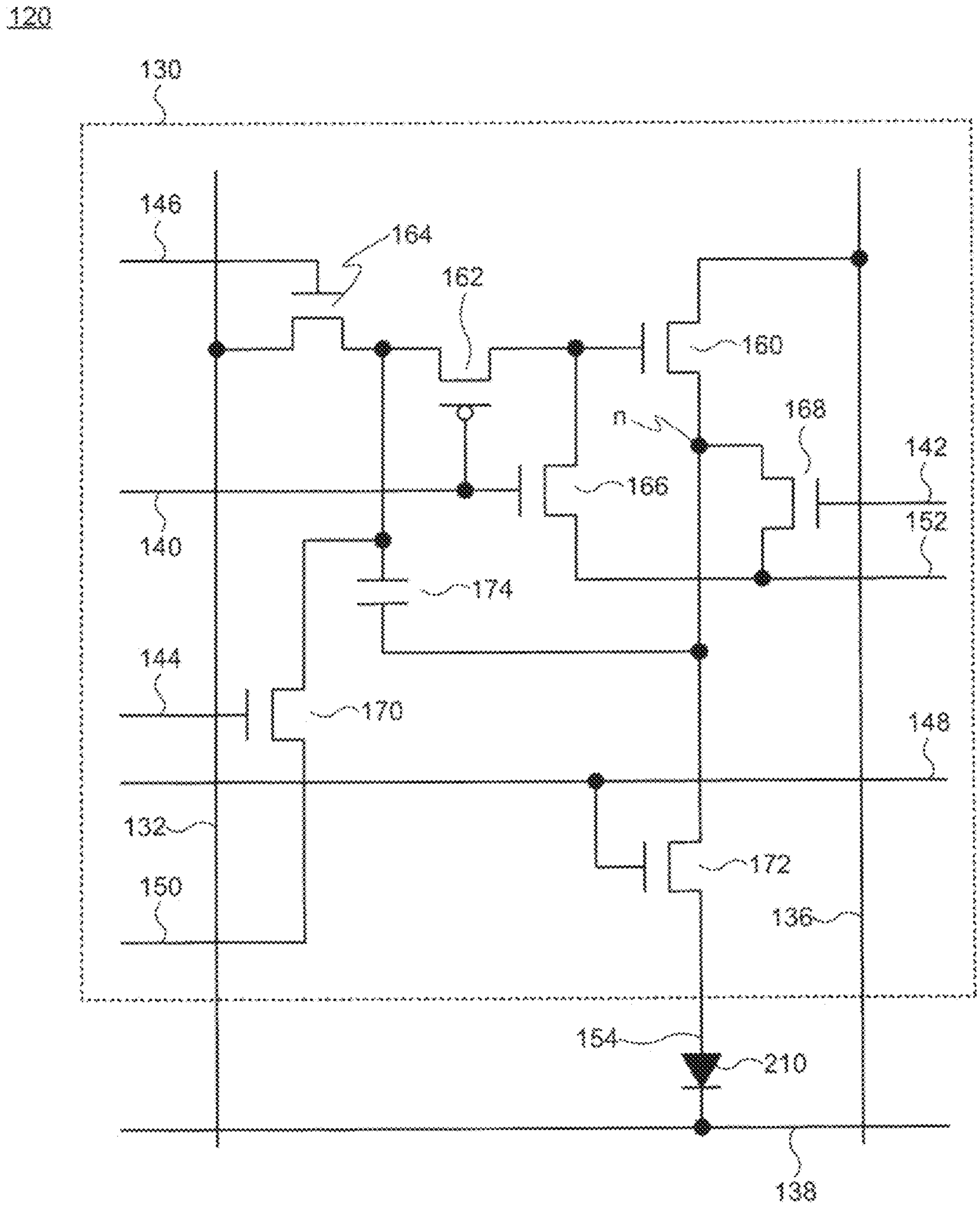
FIG. 8 is an equivalent circuit of a pixel circuit provided in a pixel of a display device according to an embodiment of the present invention.
Figure 9:
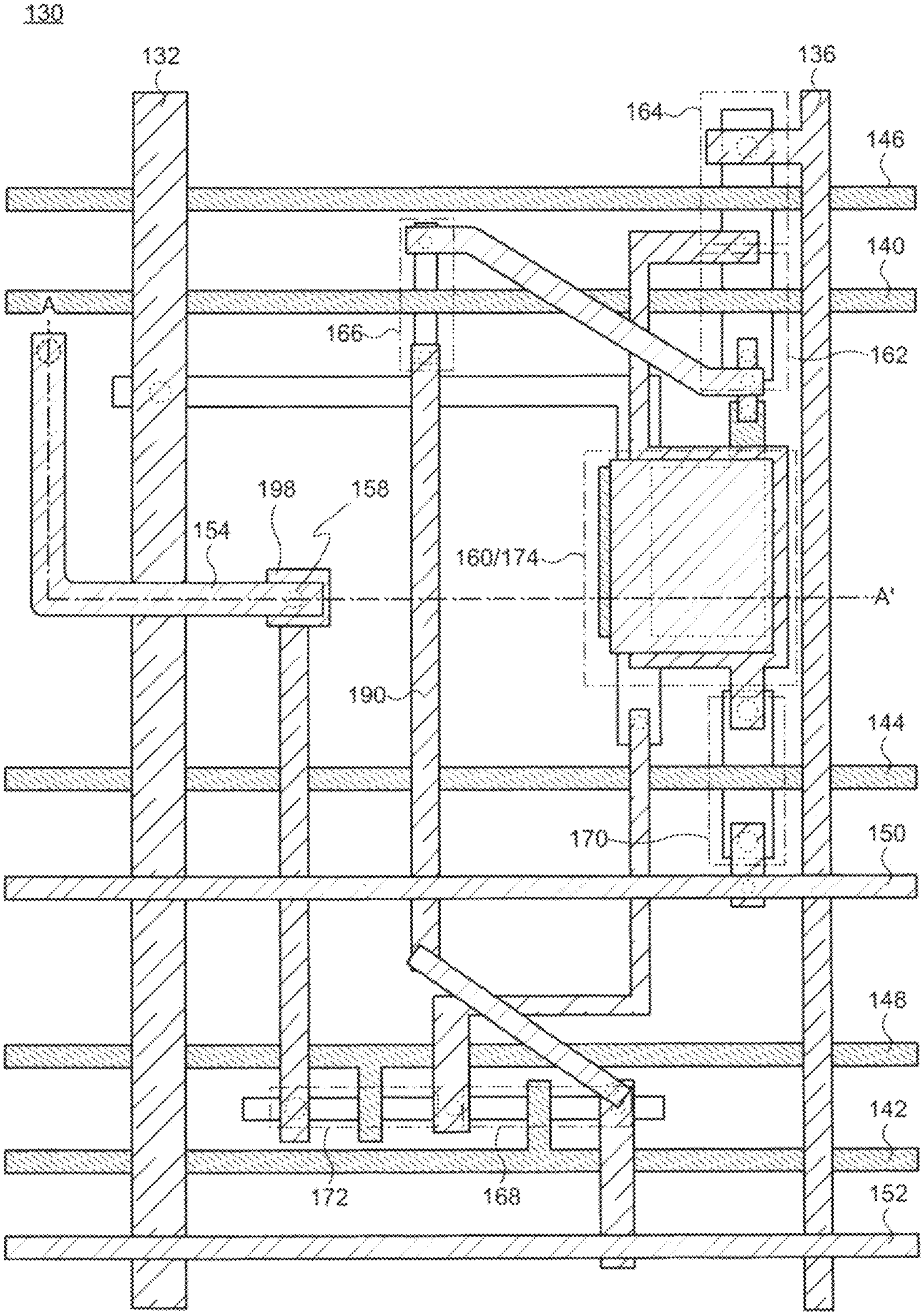
FIG. 9 is a schematic top view of a pixel circuit provided in a pixel of a display device according to an embodiment of the present invention.

An example of an equivalent circuit of the pixel circuit 130 is shown in FIG. 8, and a schematic top view of the pixel circuit 130 is shown in FIG. 9. The display device 100 is provided with a plurality of image signal lines 132 and a plurality of current-supplying lines 136 corresponding to the plurality of columns of the pixel circuits 130. That is, one image signal line 132 and one current-supplying line 136 are arranged for each column. Image signals and power are supplied from the signal-line driver circuit 112 to the pixel circuits 130 via the image signal lines 132 and the current-supplying lines 136, respectively. Therefore, the pixel circuit 130 may be configured so that the current supplied via the current-supplying line 136 is supplied to the light-emitting element 210 on the basis of the image signal supplied via the image signal line 132.

Specifically, as shown in the equivalent circuit in FIG. 8, the pixel circuit 130 has a driving transistor 160, a storage capacitance element 174, and a writing transistor 164 and also includes a switching transistor 172 to prevent an increase in writing time of the image signal. In addition to these elements, the pixel circuit 130 may also have an emission-controlling transistor 162, an initialization transistor 166, a reset transistor 168, a pre-charge transistor 170, and the like. The display device 100 is provided with gate lines (emission-controlling gate lines 140, reset gate lines 142, pre-charge gate lines 144, writing gate lines 146, switching gate lines 148), signal lines (pre-charge signal lines 150, reset signal lines 152), common wirings 138 to which a constant potential such as a ground potential is supplied, and the like. These gate lines and signal lines extend from the scanning-line driver circuit 110 or the signal-line driver circuit 112. Note that each pixel circuit 130 may be further provided with a variety of driving elements such as transistors and capacitance elements in addition to the transistors and the storage capacitance element 174 described above. The region occupied by the pixel circuit 130 is the region which is located between the current-supplying line 136 and the image signal line 132 sandwiching the driving elements of each pixel 120 in the row direction and which encompasses all of the driving elements in the column direction.

As shown in FIG. 8, one terminal of the writing transistor 164 is connected to the image signal line 132 and is supplied with image signals. The other terminal of the writing transistor 164 is connected to one terminal of the emission-controlling transistor 162. The other terminal of the emission-controlling transistor 162 is connected to a gate of the driving transistor 160. When the emission-controlling transistor 162 is off, the writing transistor 164 is turned on. After the potential of the other terminal reaches the potential of the image signal, the writing transistor 164 and the emission-controlling transistor 162 are turned off and on, respectively, so that the potential of the image signal supplied via the image signal line 132 is supplied to the gate of the driving transistor 160. As a result, the potential corresponding to the image signal is written into the driving transistor 160. The potential of the gate of the driving transistor 160 is maintained by the storage capacitance element 174.

One terminal of the initialization transistor 166 is connected to the gate of the driving transistor 160 and the other terminal of the emission-controlling transistor 162, and the other terminal thereof is connected to one terminal of the reset transistor 168. The other terminal of the reset transistor 168 is connected to one terminal of the driving transistor 160, and a gate thereof is connected to the reset gate line 142. Therefore, the gate potential of the driving transistor 160 can be initialized with the potential supplied from the reset signal line 152 by turning on the reset transistor 168 and the initialization transistor 166 and turning off the emission-controlling transistor 162.

One terminal of the driving transistor 160 (the terminal connected to the reset transistor 168) is connected to one terminal of the switching transistor 172 and one terminal of the storage capacitance element 174 (first capacitance electrode), and the other terminal thereof is connected to the current-supplying line 136. The other terminal of the switching transistor 172 is connected to the light-emitting element 210 via a relay wiring 154 connecting the pixel circuit 130 to the light-emitting element 210. When the driving transistor 160 is on, the current supplied via the current-supplying line 136 flows through the driving transistor 160. This current is not supplied to the light-emitting element 210 when the switching transistor 172 is off. The switching transistor 172 is configured to be turned on with the potential supplied from the reset gate line 142 connected to the gate thereof after the writing to the driving transistor is carried out to fully charge the node n branching the driving transistor 160, the reset transistor 168, and the light-emitting element 210. Hence, the switching transistor 172 is turned on after the node n is sufficiently charged by the writing of the image signal, and the current flowing through the driving transistor 160 is supplied to the light-emitting element 210 via the switching transistor 172 and the relay wiring 154.

One terminal of the pre-charge transistor 170 is connected to the other electrode of the storage capacitance element 174 (second capacitance electrode), the other terminal of the writing transistor 164, and one terminal of the emission-controlling transistor 162, the other terminal thereof is connected to the pre-charge signal line 150, and a gate thereof is connected to the pre-charge gate line 144. It is possible to initialize the other electrode of the storage capacitance element 174, the other terminal of the writing transistor 164, and one terminal of the emission-controlling transistor 162 by providing the pre-charge transistor 170.

Figure 10:
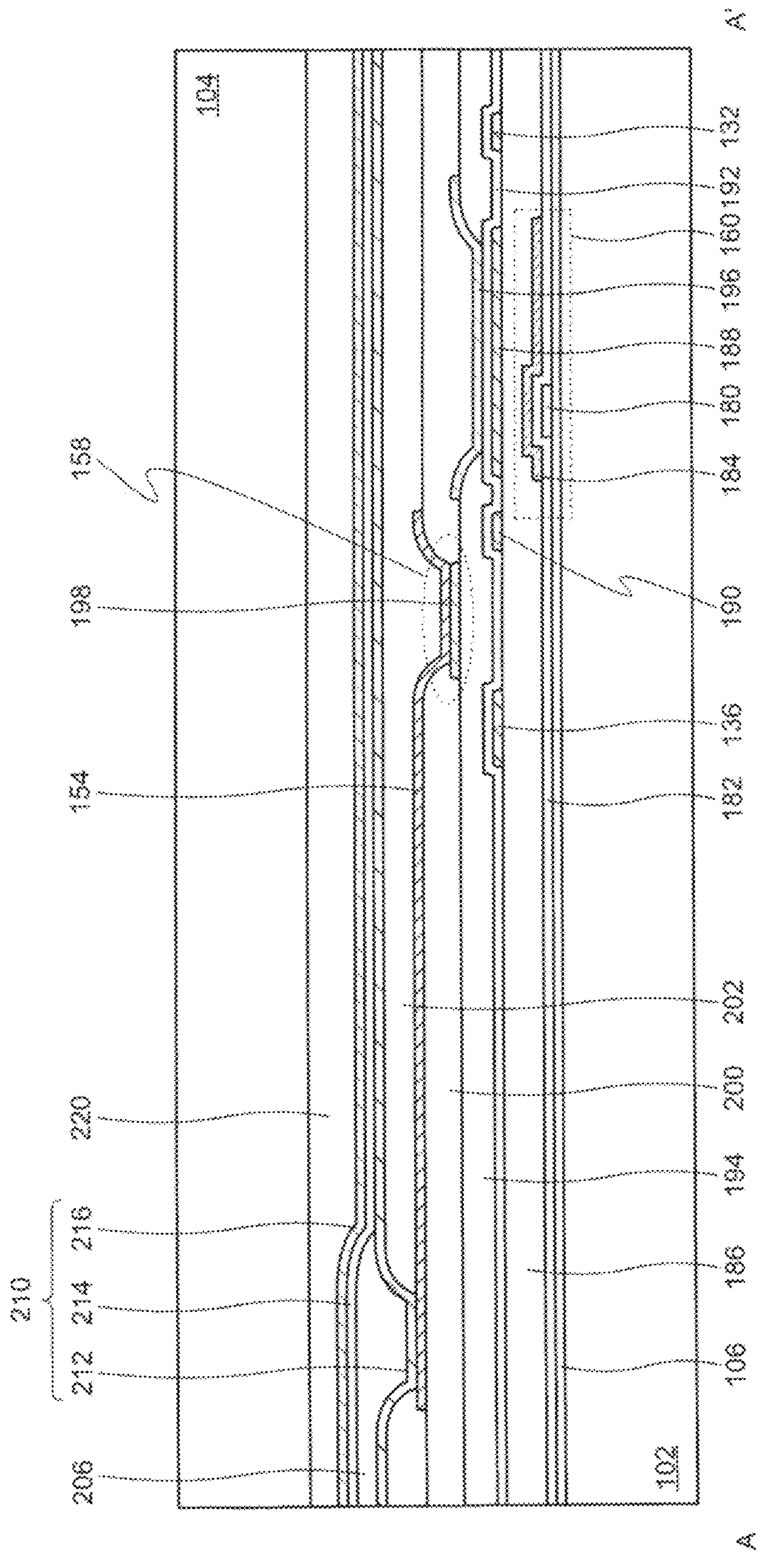
FIG. 10 is a schematic cross-sectional view including a pixel circuit provided in a pixel of a display device according to an embodiment of the present invention.

A schematic view of a cross section along the chain line A-A' in FIG. 9 is shown in FIG. 10. As shown in FIG. 10, each transistor is provided over the substrate 102 directly or through an undercoat 106 which is an optional component. The driving transistor 160 illustrated in FIG. 10 is a so-called top-gate type transistor and includes a semiconductor film 180 and a gate insulating film 182 as well as a gate electrode 184 disposed over the semiconductor film 180 via the gate insulating film 182 and the like. There are no restrictions on the structure of the transistors provided in the pixel circuit 130, including the driving transistor 160, and these transistors may each be a top-gate type transistor or a bottom-gate transistor. When top-gate transistors are employed, it is preferable to provide the undercoat 106 to prevent impurities from the substrate 102 from entering the semiconductor film 180 as shown in FIG. 10.

A first leveling film 186 is provided over the transistors to absorb unevenness thereof and provide a flat surface, and the image signal line 132 and the current-supplying line 136 as well as the first capacitance electrode 188 of the storage capacitance element 174, a wiring 190 connecting the transistors, and the like are disposed over the first leveling film 186. A capacitance insulating film 192 and a second leveling film 194 are sequentially provided to cover the first capacitance electrode 188. In the second leveling film 194, an opening overlapping the first capacitance electrode 188 and exposing the capacitance insulating film 192 is provided, and the second capacitance electrode 196 is arranged to cover this opening. This configuration provides the storage capacitance element 174. A connection pad 198 existing in the same layer as the first capacitance electrode 188 is further provided over the second leveling film 194. The connection pad 198 is connected to the other terminal of the switching transistor 172 and is used to connect the switching transistor 172 and the relay wiring 154. The connection pad 198 is provided within the region occupied by each pixel circuit 130. Over the connection pad 198 and the second capacitance electrode 196, a third leveling film 200 is provided with an opening 158 exposing the connection pad 198 and serving as a contact portion for the switching transistor 172 and the relay wiring 154.

4-3. Connection of Pixel Circuit and Light-Emitting Element by Relay Wiring

The relay wiring 154 is formed over the third leveling film 200 to cover the opening 158 of the third leveling film 200. The switching transistor 172 and the relay wiring 154 are electrically connected to each other through this opening 158.

A fourth leveling film 202 is provided over the relay wiring 154. An opening is also provided in the fourth leveling film 202 to expose the relay wiring 154, and the pixel electrode 212 is formed to cover this opening. As a result, the relay wiring 154 and the pixel electrode 212 are connected, and the switching transistor 172 of the pixel circuit 130 and the light-emitting element 210 are electrically connected with the relay wiring 154. Over the opening formed in the fourth leveling film 202, a partition wall 206 is provided to cover this opening and an edge portion of the pixel electrode 212. The partition wall 206 electrically insulates the adjacent light-emitting elements 210. The EL layer 214 is provided so as to be in contact with the partition wall 206 and the pixel electrode 212, and the counter electrode 216 is further formed over the EL layer 214. The light-emitting element 210 is composed of the pixel electrode 212, the EL layer 214, and the counter electrode 216. The counter substrate 104 is fixed over the light-emitting element 210 using an adhesive which is not illustrated, by which the plurality of pixels 120, the scanning-line driver circuit 110, and the signal-line driver circuit 112 are protected. As an optional component, a sealing film 220 may be provided between the light-emitting elements 210 and the counter substrate 104.

As described above, the light-emitting element 210 and the pixel circuit 130 are electrically connected to each other via the relay wiring 154. As shown in FIG. 9 and FIG. 10, one terminal of the relay wiring 154 is connected to one terminal of the switching transistor 172 via the opening 158 formed in the pixel circuit 130. Therefore, one terminal of each relay wiring 154 is located within the pixel circuit 130 thereof. However, the display region encompassing the light-emitting elements 210 is wider than the region where the pixel circuits 130 are provided as mentioned above. Therefore, the distance from the pixel circuit 130 to the light-emitting element 210, that is, the length of the relay wiring 154, varies within the display device 100 depending on the position of the light-emitting element 210.

Figure 11:
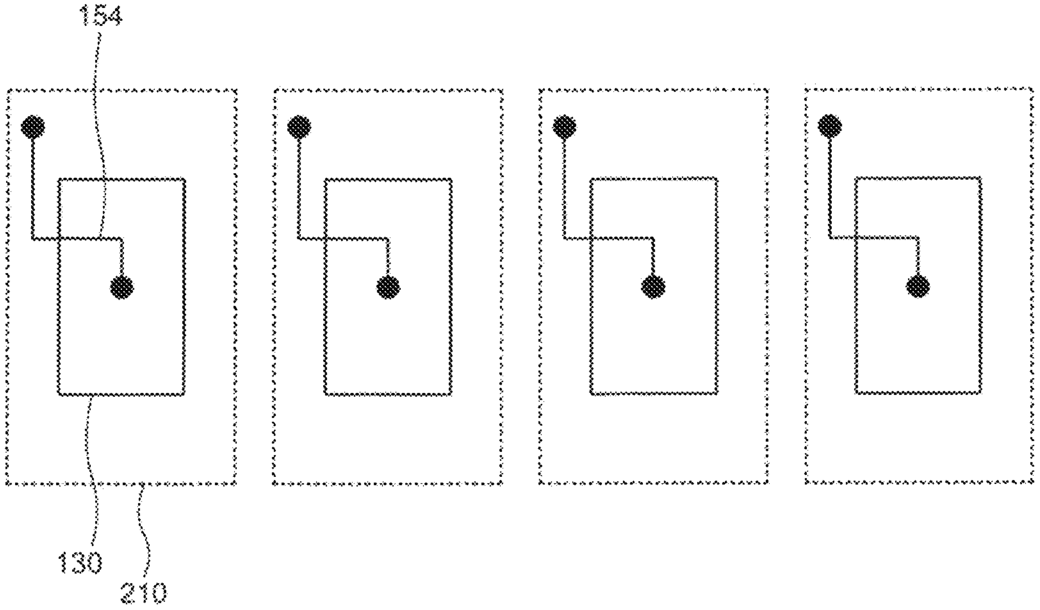
FIG. 11 is a schematic top view showing a positional relationship between a pixel circuit and a light-emitting element of a display device according to an embodiment of the present invention.

For example, in the pixels 120 far from the scanning-line driver circuit 110 (in the case where a plurality of scanning-line driver circuits 110 is provided, the pixels at and near the midpoint of adjacent scanning-line driver circuits 110), the distance between the pixel circuit 130 and the light-emitting element 210 is small, and the pixel circuit 130 and the light-emitting element electrically connected to each other may overlap each other as schematically shown in FIG. 11. Moreover, although not illustrated, the other terminal of the relay wiring 154 can also be arranged within the pixel circuit 130. Therefore, the relay wiring 154 is short.

Figure 12:
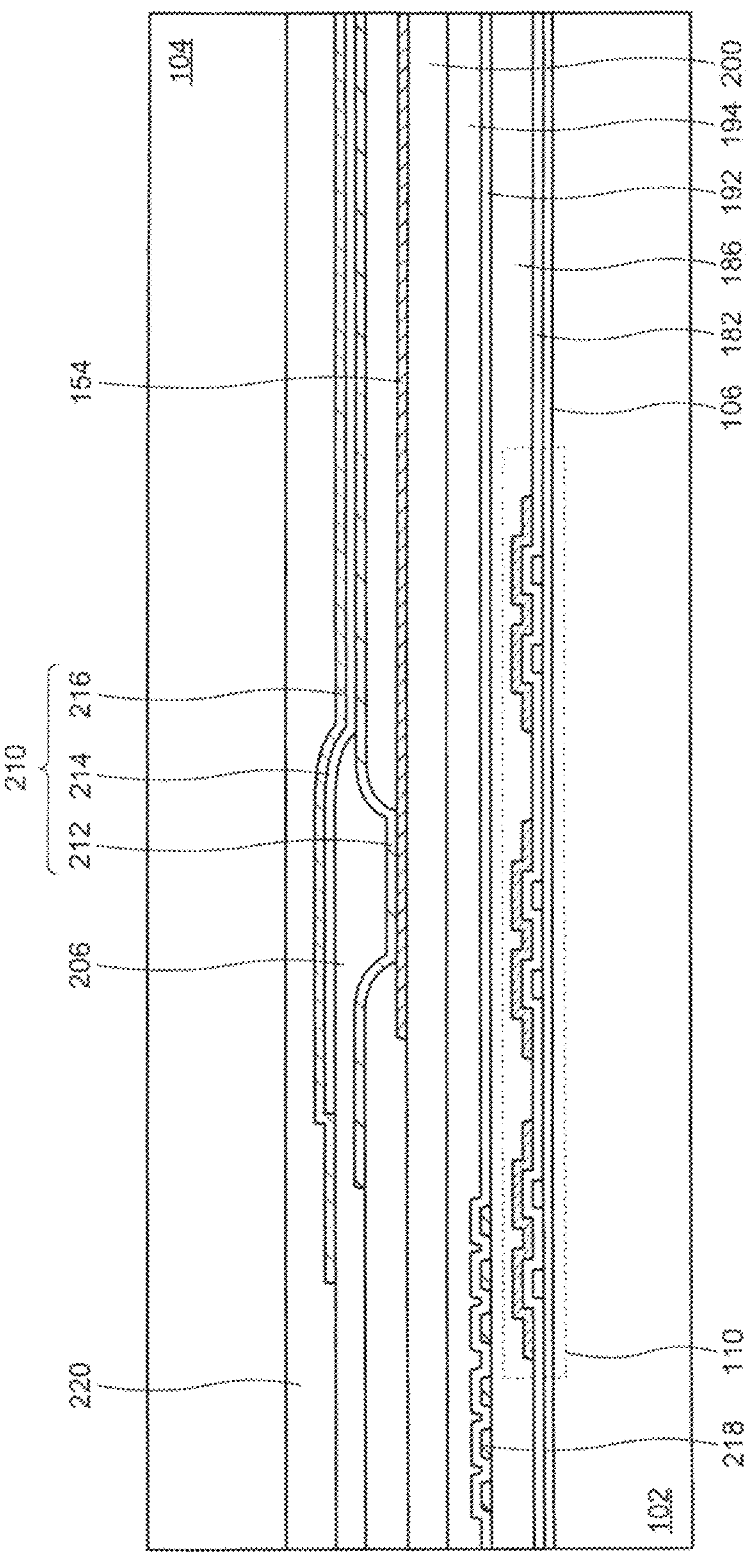
FIG. 12 is a schematic cross-sectional view including a pixel circuit provided in a pixel of a display device according to an embodiment of the present invention.
Figure 13:
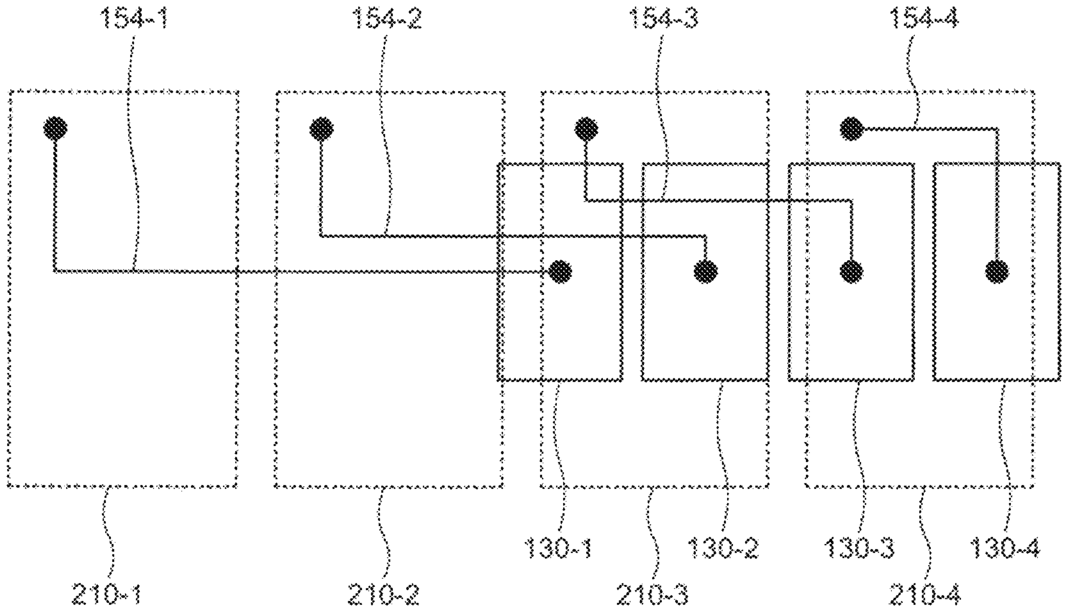
FIG. 13 is a schematic top view showing a positional relationship between a pixel circuit and a light-emitting element of a display device according to an embodiment of the present invention.

However, the light-emitting elements 210 over or close to the scanning-line driver circuit 110 may not overlap the corresponding pixel circuits 130. Thus, although lead wirings 218 and each element constituting the scanning-line driver circuit 110 are provided under the light-emitting element 210 located at the outermost edge portion of the display region, the pixel circuit 130 is not provided as schematically shown in FIG. 12, and the light-emitting element 210 is connected to the relay wiring 154 extending over the pixel circuit 130 of the other pixel 120. When considering four light-emitting elements 210-1 to 210-4 overlapping or located close to the scanning-line driver circuit 110 as an example as shown in FIG. 13, although one terminal of the relay wiring 154 overlaps the light-emitting element 210 or the pixel electrode 212 thereof in each of the light-emitting elements 210-1 to 210-3, the other terminal does not overlap the corresponding light-emitting element 210. Therefore, in the first pixel circuit group described above, although the distance between the pixel circuit 130 and the corresponding light-emitting element 210 and the length of the relay wiring 154 connecting them can be the same, the distances from the light-emitting elements 210-1 to 210-4 to their corresponding pixel circuits 130 are different, and the lengths of the relay wirings 154 are also different. Moreover, when all of the pixel circuits 130 are arranged at the same pitch in each row, the length of the relay wiring 154 increases with decreasing distance from the scanning-line driver circuit 110. Even when the arrangement density of the pixel circuits 130 varies in each row, the length of the relay wiring 154 increases with decreasing distance from the scanning-line driver circuit 110, especially for the pixel circuits 130 arranged close to the scanning-line driver circuit 110.

Since an increase in length of the relay wiring 154 increases the constant resistance load (CR load) thereof and results in a delay in charging the node n branching the driving transistor 160, the reset transistor 168, and the light-emitting element 210 (see FIG. 8), a longer time is required for writing to the driving transistor 160. That is, the time required to maintain the writing transistor 164 in an on-state increases, which causes a display delay.

However, as described above, the pixel circuit 130 has the switching transistor 172 between the relay wiring 154 and the driving transistor 160, and the switching transistor 172 is configured to turn on after the node n is sufficiently charged. Therefore, since the switching transistor 172 turns on after the gate-source potential $V_{gs}$ of the driving transistor 160 is fixed in the saturation region, a constant current can be supplied to the light-emitting element 210 independent of the length of the relay wiring 154. As a result, the light-emitting element 210 can emit light at a predetermined luminance. Therefore, even if a wide display region is set over the substrate 102, no display delay is caused. Note that, although a part of the charge flows from the storage capacitance element 174 to the light-emitting element 210 via the relay wiring 154 immediately after the switching transistor 172 is turned on, this influence can almost be ignored because a sufficient amount of current can be supplied to the light-emitting element 210 through the driving transistor 160.

As described above, in the display device 100 according to an embodiment of the present invention, a portion of the plurality of light-emitting elements 210 is arranged to overlap the scanning-line driver circuit 110. Hence, a display device having a narrow frame and an extremely wide display region can be provided. In addition, the switching transistor 172 provided between the relay wiring 154 and the driving transistor 160 eliminates the influence caused by the change in the length of the relay wiring 154 connecting the light-emitting element 210 and the pixel circuit 130. Furthermore, the plurality of pixels 120 structuring the display region can be driven in a state where the pixels 120 are divided into a plurality of blocks each containing the pixels 120 arranged in two or more columns when three or more scanning-line driver circuits 110 are provided. Therefore, each scanning-line driver circuit 110 is capable of performing display by controlling only the pixels 120 in the corresponding block, by which the load on the scanning-line driver circuit 110 can be reduced and the signal delay caused by the load on the scanning-line driver circuit 110 can also be prevented. Due to these features, the application of an embodiment of the invention makes it possible to produce high-resolution and ultra-large display devices with a narrow frame.

Second Embodiment

In this embodiment, modified examples of the display device 100 described in the First Embodiment are explained. Descriptions of the configurations the same as or similar to those described in the First Embodiment may be omitted.

Figure 14:
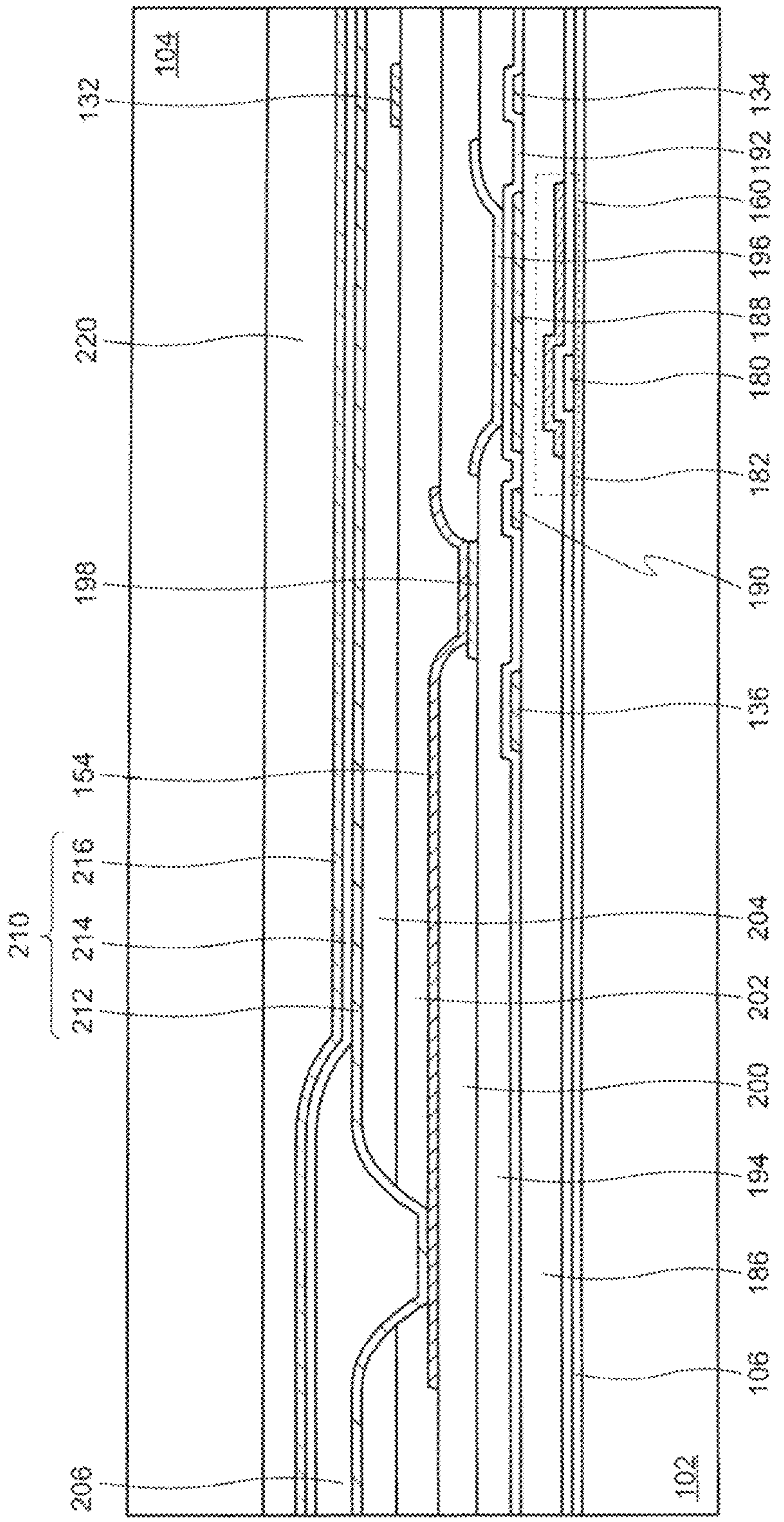
FIG. 14 is a schematic cross-sectional view including a pixel circuit provided in a pixel of a display device according to an embodiment of the present invention.

In the display device 100 according to the First Embodiment, the image signal line 132 and the current-supplying line 136 exist in the same layer. In contrast, in the display device 100 according to this embodiment, the image signal line 132 is located in a different layer from the current-supplying line 136 in order to reduce the coupling capacitance between the image signal line 132 and a variety of gate lines. Specifically, as shown in FIG. 14 which is a schematic cross-sectional view corresponding to FIG. 10, the image signal line 132 is arranged over the fourth leveling film 202. This arrangement significantly increases the distance between the image signal line 132 and the variety of gate lines, thereby reducing the coupling capacitance therebetween, by which the load on the signal-line driver circuit 112 is reduced, and the signal delay can be prevented. A fifth leveling film 204 is further provided over the image signal line 132, and the pixel electrode 212 and the relay wiring 154 are connected through an opening provided in the fourth leveling film 202 and the fifth leveling film 204 to expose the relay wiring 154. Since the relay wiring 154 and the image signal line 132 exist in different layers, interference therebetween is prevented, and as a result, the relay wiring 154 can be arranged to intersect the image signal line 132.

Here, in order to supply image signals from the image signal line 132 to the writing transistor 164, a sub-image signal line 134 existing in a different layer from the image signal line 132 is provided. For example, the sub-image signal line 134 existing in the same layer as the current-supplying line 136 is arranged between the first leveling film 186 and the second leveling film 194. The sub-image signal line 134 extends parallel to the image signal line 132. Although the sub-image signal line 134 overlaps the image signal line 132 in an example demonstrated in FIG. 14, the sub-image signal line 134 does not necessarily have to overlap the image signal line 132.

Figure 15:
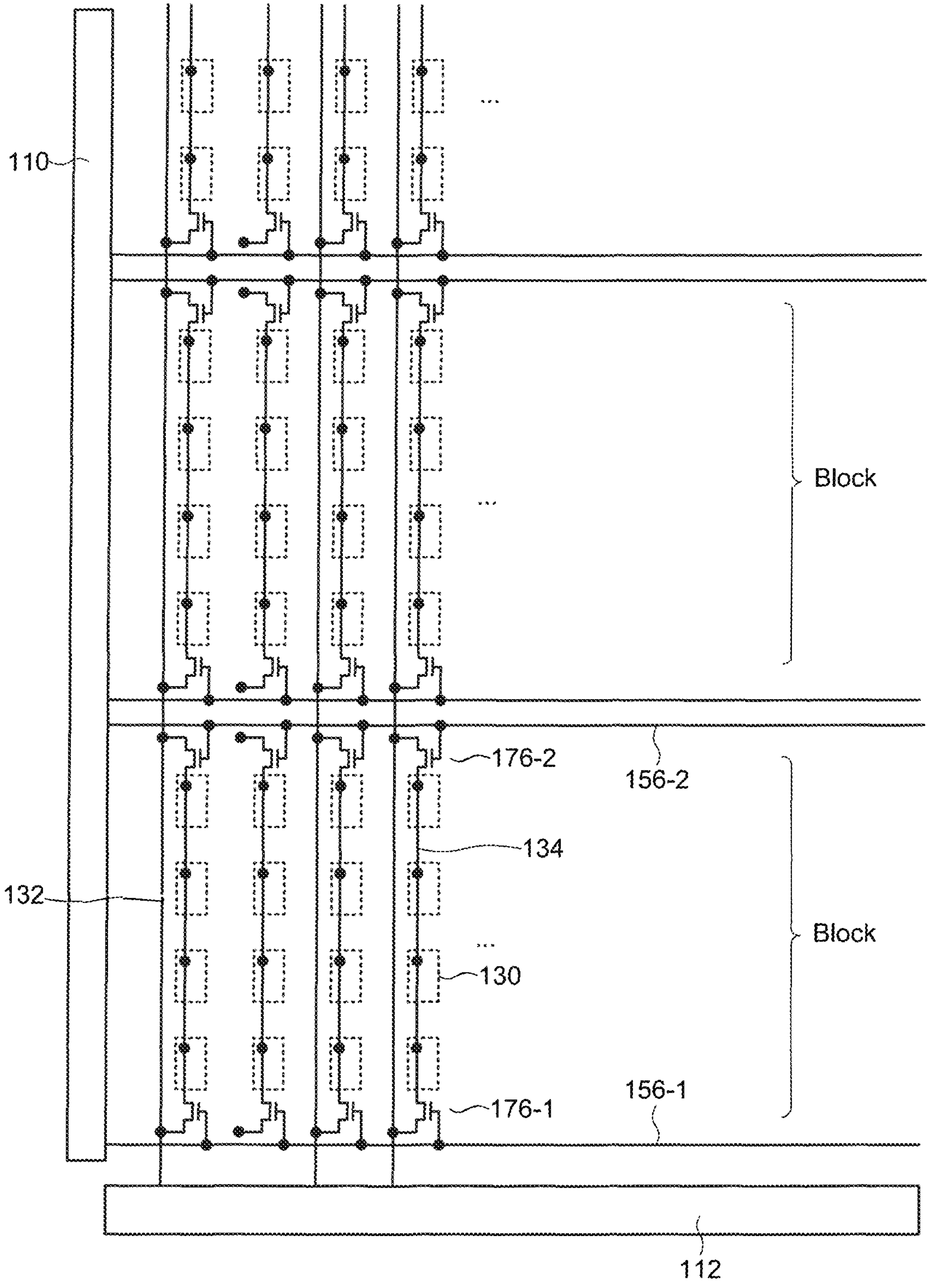
FIG. 15 is a schematic top view of a display device according to an embodiment of the present invention.

Furthermore, although one image signal line 132 is arranged in each column, a plurality of sub-image signal lines 134 is arranged in each column as shown in FIG. 15. In addition, in each column, each sub-image signal line 134 is electrically connected to the image signal line 132 via at least one selection transistor 176 and to two or more pixel circuits 130 and supplies these pixel circuits 130 with image signals supplied via the image signal line 132. The number of pixel circuits 130 connected to one sub-image signal line 134 is preferred to be the same, but may differ within each column. This configuration allows all of the pixels 120 located in each column to be divided into blocks each containing two or more pixels 120.

A gate of the selection transistor 176 is connected to a selection gate line 156 extending from the sub-signal line selection circuit structuring the scanning-line driver circuit 110. When the selection transistor 176 is turned on according to the potential supplied via the selection gate line 156, image signals are supplied from the image signal line 132 to the sub-image signal line 134 via the selection transistor 176, and thus, the image signals are supplied to two or more of the pixel circuits 130 connected to this sub-image signal line 134. Note that a pair of selection transistors 176-1 and 176-2 may be connected to each sub-image signal line 134. In this case, a pair of selection gate lines 156-1 and 156-2 is connected to the pair of selection transistors 176-1 and 176-2, respectively, and each sub-image signal line 134 is connected to two or more-pixel circuits 130 between the pair of selection transistors 176-1 and 176-2 as shown in FIG. 15.

In each column, the selection transistors 176 are not driven simultaneously, but are configured to be sequentially driven. That is, when the selection transistor 176 is connected to each sub-image signal line 134, the scanning-line driver circuit 110 and the selection transistor 176 are configured so that, in each column, one of the plurality of selection transistors 176 is turned on, this selection transistor 176 is turned off after the writing to the pixel circuit 130 connected thereto is completed, and then the subsequent selection transistor 176 is turned on. When the pair of selection transistors 176-1 and 176-2 is connected to one sub-image signal line 134, after the pair of selection transistors 176-1 and 176-2 connected to this one sub-image signal line 134 is simultaneously turned on to supply image signals to this sub-image signal line 134, this pair of selection transistors 176-1 and 176-2 is simultaneously turned off, and then the pair of selection transistors 176-1 and 176-2 connected to the subsequent sub-image signal line 134 is simultaneously turned on in each column. Thus, it is possible to drive the pixels 120 for each block containing two or more of the pixel circuits 130 in each column. Therefore, the capacitive coupling between the sub-image signal line 134 and the variety of gate lines can also be reduced, thereby reducing the load on the signal-line driver circuit 112 and preventing signal delays and the like.

Figure 16:
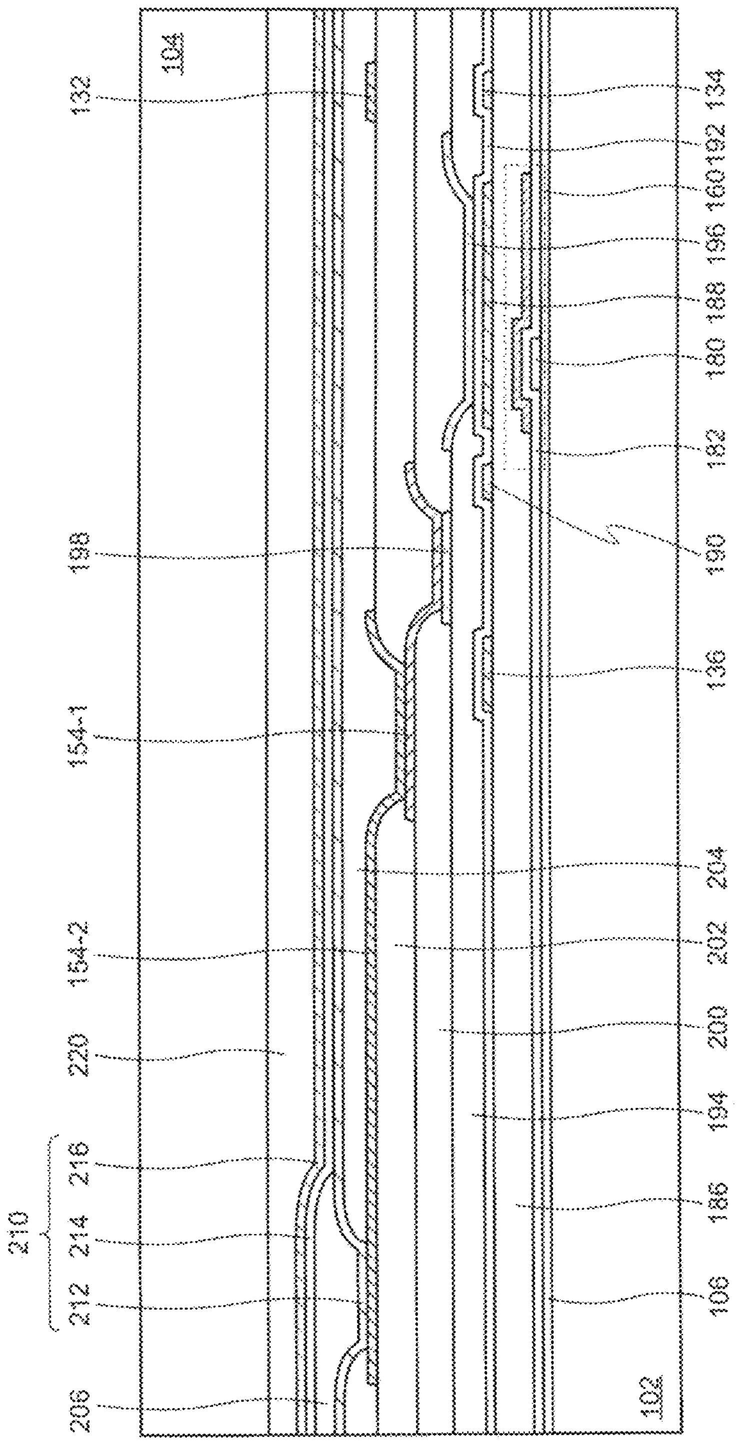
FIG. 16 is a schematic cross-sectional view including a pixel circuit provided in a pixel of a display device according to an embodiment of the present invention.

In this modified example, the relay wiring 154 may be composed of two relay wirings existing in different layers as shown in FIG. 16 which is a schematic cross-sectional view corresponding to FIG. 10. More specifically, the relay wiring 154 may be configured by a first relay wiring 154-1 located over the third leveling film 200 and connected to the switching transistor 172 via the connection pad 198 and a second relay wiring 154-2 over the fourth leveling film 202 arranged over the first relay wiring 154-1. An opening is provided in the fourth leveling film 202 to expose the first relay wiring 154-1, and the first relay wiring 154-1 and the second relay wiring 154-2 are connected through this opening. The opening in the fourth leveling film 202 (i.e., the connection portion between the first relay wiring 154-1 and the second relay wiring 154-2) may be located within the pixel circuit 130 or outside the pixel circuit 130. Since the second relay wiring 154-2 is located in the same layer as the image signal line 132 in this configuration, the second relay wiring 154-2 is provided so as not to intersect the image signal line 132. For example, the second relay wiring 154-2 is arranged to extend parallel to the image signal line 132 or in a direction which does not intersect the image signal line 132. On the other hand, since the first relay wiring 154-1 exists in a different layer from the image signal line 132, they do not interfere with each other even if the first relay wiring 154-1 intersects the image signal line 132. Therefore, the use of the first relay wiring 154-1 allows the relay wiring 154 to be extended to the corresponding light-emitting element 210 while intersecting the pixel circuits 130 which are not connected to this first relay wiring 154-1. The connection between the second relay wiring 154-2 and the light-emitting element 210 is performed using an opening provided in the fifth leveling film 204.

Although not illustrated, when the relay wiring 154 is composed of two relay wirings existing in different layers, the image signal line 132 may be arranged in the same layer as the first relay wiring 154-1. That is, the image signal line 132 may be arranged between the third leveling film 200 and the fourth leveling film 202. In this case, the first relay wiring 154-1 is arranged to extend parallel to the image signal line 132 or in a direction which does not intersect the image signal line 132. On the other hand, since the second relay wiring 154-2 exists in a different layer from the image signal line 132, they do not interfere with each other even if the second relay wiring 154-2 intersects the image signal line 132. Therefore, the use of the second relay wiring 154-2 allows the relay wiring 154 to be extended to the corresponding light-emitting element 210 while intersecting the pixel circuits 130 which are not connected to this second relay wiring 154-2.

In the display device 100 according to the modified examples described in this embodiment, since the light-emitting elements 210 can be arranged so that part of the display region overlaps the scanning-line driver circuit 110, the frame can be narrowed, and the area of the display region can be set higher (e.g., 90% or more) with respect to the area of the display device 100. In addition, since three or more scanning-line driver circuits 110 can be provided, it is possible to prevent an increase in the load on the scanning-line driver circuit 110 caused by an increase in the size of the display device 100. In addition, since the switching transistor 172 is arranged in the pixel circuit 130, signal delay and the like caused by an increase in the CR load of the relay wiring 154 does not occur. Furthermore, the image signal line 132 can be arranged at a position far from the variety of gate lines, and the image signals can be sequentially written using the plurality of sub-image signal lines 134 connected to each image signal line 132. Hence, the capacitive coupling between the image signal lines 132 and the gate lines can be reduced. Moreover, the load on the signal-line driver circuit can also be reduced because the pixels 120 can be driven block by block in each column. In addition to these features, since the display device 100 has electroluminescence elements as a display element, the contrast and color reproducibility of images are high, and the response speed is large. Due to these features, implementation of the embodiment of the present invention enables the production of high-resolution and ultra-large display devices capable of displaying high-quality images and having a wide display region.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process on the basis of each embodiment is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A display device comprising:

a plurality of pixels each comprising a light-emitting element and a pixel circuit electrically connected to the light-emitting element; and at least one scanning-line driver circuit electrically connected to the plurality of pixels, wherein the pixel circuits each do not overlap the at least one scanning-line driver circuit, a display region defined as a minimum rectangle encompassing all of the light-emitting elements partly overlaps the at least one scanning-line driver circuit, the pixel circuits are arranged in a matrix form having a plurality of rows and a plurality of columns and each comprise:

- a driving transistor configured to supply a current to the light-emitting element; and
- a switching transistor configured to supply the current from the driving transistor to the light-emitting element, the switching transistor and the light-emitting element are electrically connected to each other through a relay wiring in each of the plurality of pixels, the at least one scanning-line driver circuit extends in a column direction, each of the plurality of rows comprises:

- a first pixel circuit group consisting of two pixel circuits adjacent in a row direction at a first spacing; and
- a second pixel circuit group consisting of two pixel circuits adjacent in the row direction at a second spacing, the second pixel circuit group is located closer to the at least one scanning-line driver circuit than the first pixel circuit group, the second spacing is smaller than the first spacing, the lengths of the relay wirings are the same in the first pixel circuit group, and the lengths of the relay wirings increase with decreasing distance from the at least one scanning-line driver circuit in the second pixel circuit groups.

2. The display device according to claim 1, wherein the at least one scanning-line driver circuit includes a pair of scanning-line driver circuits, and the pair of scanning-line driver circuits is arranged so as to sandwich all of the pixel circuits.

3. The display device according to claim 1, wherein the at least one scanning-line driver circuit includes a first scanning-line driver circuit, a second scanning-line driver circuit, and a third scanning-line driver circuit, the first scanning-line driver circuit and the second scanning-line driver circuit are arranged so as to sandwich all of the pixel circuits, and the third scanning-line driver circuit is arranged so as to be sandwiched by the first scanning-line driver circuit and the second scanning-line driver circuit.

4. The display device according to claim 1, wherein the pixel circuits are arranged at a same pitch in each of the plurality of rows.

5. The display device according to claim 4, wherein a length of the relay wiring increases with decreasing distance from the at least one scanning-line driver circuit in each of the plurality of rows.

6. The display device according to claim 1, wherein the pixel circuits are arranged so that a pitch thereof decreases with decreasing distance from the at least one scanning-line driver circuit in each of the plurality of rows.

7. The display device according to claim 6, wherein a length of the relay wiring increases with decreasing distance from the at least one scanning-line driver circuit in each of the plurality of rows.

8. The display device according to claim 1, wherein the relay wiring comprises a first relay wiring and a second relay wiring existing in different layers and electrically connected to each other.

9. The display device according to claim 8, further comprising a plurality of image signal lines configured to supply an image signal to the pixel circuits, wherein the second relay wiring exists in a same layer as the image signal lines.

10. The display device according to claim 9, wherein the second relay wiring extends in a direction parallel to the image signal lines.

11. The display device according to claim 9, wherein the first relay wiring extends in a direction intersecting an extending direction of the image signal lines.

12. The display device according to claim 8, further comprising a leveling film over the second relay wiring, wherein each of the light-emitting elements of the plurality of pixels comprises a pixel electrode, an electroluminescence layer over the pixel electrode, and a counter electrode over the electroluminescence layer, and the second relay wiring and the pixel electrode are electrically connected to each other in an opening formed in the leveling film so as to expose the second relay wiring.

13. A display device comprising:

a plurality of pixels each comprising a light-emitting element and a pixel circuit electrically connected to the light-emitting element;

at least one scanning-line driver circuit electrically connected to the plurality of pixels;

a plurality of image signal lines; and a plurality of sub-image signal lines extending parallel to the plurality of image signal lines, wherein the pixel circuits each do not overlap the at least one scanning-line driver circuit, a display region defined as a minimum rectangle encompassing all of the light-emitting elements partly overlaps the at least one scanning-line driver circuit, the pixel circuits are arranged in a matrix form having a plurality of rows and a plurality of columns and each comprise:

a driving transistor configured to supply a current to the light-emitting element; and a switching transistor configured to supply the current from the driving transistor to the light-emitting element, the switching transistor and the light-emitting element are electrically connected to each other through a relay wiring in each of the plurality of pixels, the plurality of image signal lines is arranged one by one for each column, two or more of the plurality of sub-image signal lines are arranged in each column, and in each of the plurality of columns, each of the pixel circuits is electrically connected to any one of the plurality of sub-image signal lines, each of the plurality of sub-image signal lines is electrically connected to the image signal line through at least one selection transistor, and the plurality of sub-image signal lines is located under the image signal line and overlaps the image signal line.

14. The display device according to claim 13, wherein the at least one selection transistor includes a pair of selection transistors, and two or more of the pixel circuits are electrically connected to the sub-image signal line between the pair of selection transistors.

15. The display device according to claim 13, further comprising a plurality of selection gate lines extending from the at least one scanning-line driver circuit, wherein each of the plurality of selection gate lines is connected to a gate of the corresponding at least one selection transistor.

16. The display device according to claim 13, further comprising a current-supplying line arranged in each of the plurality of columns, wherein the plurality of sub-image signal lines exists in a same layer as the current-supplying line.

* * * * *